United States Patent
Joshi et al.

(10) Patent No.: US 10,859,538 B2
(45) Date of Patent: Dec. 8, 2020

(54) PASSIVE WIRELESS SENSOR

(71) Applicant: Marquette University, Milwaukee, WI (US)

(72) Inventors: Shrinivas G. Joshi, Brookfield, WI (US); Meghna Saikia, Milwaukee, WI (US)

(73) Assignee: Marquette University, Milwaukee, WI (US)

( * ) Notice: Subject to any disclaimer, the term of this patent is extended or adjusted under 35 U.S.C. 154(b) by 788 days.

(21) Appl. No.: 15/097,743

(22) Filed: Apr. 13, 2016

(65) Prior Publication Data

US 2016/0223497 A1 Aug. 4, 2016

Related U.S. Application Data

(63) Continuation-in-part of application No. PCT/US2014/060710, filed on Oct. 15, 2014.

(60) Provisional application No. 61/891,582, filed on Oct. 16, 2013.

(51) Int. Cl.
*G01N 29/44* (2006.01)
*G01F 1/66* (2006.01)

(52) U.S. Cl.
CPC .............. *G01N 29/44* (2013.01); *G01F 1/66* (2013.01); *G01F 1/662* (2013.01)

(58) Field of Classification Search
CPC ............ G01N 29/44; G01F 1/66; G01F 1/662
See application file for complete search history.

(56) References Cited

U.S. PATENT DOCUMENTS

| | | | | |
|---|---|---|---|---|
| 5,450,087 A | * | 11/1995 | Hurta | G01S 13/75 342/42 |
| 2001/0037676 A1 | * | 11/2001 | Chang | G01F 1/66 73/114.33 |
| 2004/0264977 A1 | * | 12/2004 | Yap | G02F 2/02 398/161 |
| 2005/0192727 A1 | * | 9/2005 | Shostak | B60C 11/24 701/37 |
| 2005/0240110 A1 | | 10/2005 | Liu et al. | |

(Continued)

FOREIGN PATENT DOCUMENTS

WO 2009143541 A2 5/2010

OTHER PUBLICATIONS

International Search Report and Written Opinion issued in corresponding International Application No. PCT/US2014/060710, dated Feb. 19, 2015.

(Continued)

*Primary Examiner* — Hovhannes Baghdasaryan
*Assistant Examiner* — Amie M Ndure
(74) *Attorney, Agent, or Firm* — Andrus Intellectual Property Law, LLP

(57) ABSTRACT

Passive wireless sensors include an antenna. The antenna receives a combined signal. The combined signal includes a low frequency modulating signal modulated on a high frequency carrier wave. A demodulator receives the combined signal and extracts the modulating signal. A sensor receives the extracted modulating signal and produces an output signal with a time delay indicative of a property to be sensed. A modulator receives the output signal and the high frequency carrier wave and modulates the output signal onto the high frequency carrier wave to create a combined output signal broadcast by the antenna.

20 Claims, 13 Drawing Sheets

(56) References Cited

U.S. PATENT DOCUMENTS

| | | | | |
|---|---|---|---|---|
| 2008/0157940 A1* | 7/2008 | Breed | ............... | B60C 11/24 |
| | | | | 340/425.5 |
| 2008/0296208 A1* | 12/2008 | Ikeyama | ............ | B01D 61/025 |
| | | | | 210/87 |
| 2010/0326211 A1* | 12/2010 | Stein | ............... | A61B 5/4528 |
| | | | | 73/862.636 |
| 2011/0040498 A1* | 2/2011 | Huang | ............... | G01B 7/16 |
| | | | | 702/34 |
| 2011/0160616 A1* | 6/2011 | Stein | ............... | A61B 5/4528 |
| | | | | 600/587 |
| 2013/0023795 A1* | 1/2013 | Stein | ............... | G06Q 50/24 |
| | | | | 600/587 |
| 2014/0094715 A1* | 4/2014 | Stein | ............... | A61B 5/0031 |
| | | | | 600/587 |

OTHER PUBLICATIONS

International Preliminary Report on Patentability issued in corresponding International Application No. PCT/US2014/060710, dated Apr. 19, 2016.

Plessky et al., "Review on SAW RFID Tags", IEEE Trans. Ultrason, Ferroelec, Freq. Control, vol. 57, pp. 654-668, Mar. 2010.

Reindl et al., "Theory and Application of Passive SAW Radio Transponders as Sensors" IEEE Trans. Ultrason, Ferroelec, Freq. Control, vol. 45, pp. 1281-1292, Sep. 1998.

\* cited by examiner

PASSIVE WIRELESS SENSOR

CROSS-REFERENCE TO RELATED PATENT APPLICATIONS

The present application is a continuation-in-part of International Application No. PCT/US2014/060710, filed Oct. 15, 2014, which claims the benefit of priority under 35 U.S.C. § 119(e) to U.S. Provisional Patent Application No. 61/891,582, filed on Oct. 16, 2013, the content of which is incorporated herein by reference in its entirety.

STATEMENT REGARDING GOVERNMENT SPONSORED RESEARCH OR DEVELOPMENT

This invention was made with government support under Grant No. IIP-0968844 awarded by the National Science Foundation Industry & University Cooperative Research Program. The U.S. Government has certain rights in this invention.

BACKGROUND

The present disclosure is related to wireless sensors. More specifically, the present disclosure is related to remotely read, passive, wireless sensors.

Wireless tags and sensors can be subdivided into two categories, exemplarily passive and active systems. Active tags or sensors usually have an on-board battery, while passive tags and sensors power their circuitry by rectifying a part of the request signal energy transmitted by an external reader. Incorporation of a battery into an active tag or sensor increases the cost of the device and limits the device life time. The minimum voltage for operating the rectifier stage for extracting the supply power from a request signal, together with the limited device and radiation power for a readout signal restricts the reading distance of passive IC-RFID tags to a limited range. The separation between the strong request signal and the small response signal of the tag is achieved by using the subcarrier frequency between both signals. Surface acoustic wave (SAW) tags and sensors, on the other hand, are linear, time-invariant systems which simply reflect the request signal in a coded form that carries the identification or sense information. Due to this, SAW devices enable a reading distance of several meters for passive SAW devices. SAW devices feature low losses, large delay time, and small dimensions.

However, SAW devices operate at higher frequencies, often in the gigahertz range. This facilitates small antenna size as antenna sizes are inversely proportional to the frequency of the antenna. However, SAW based sensors are now applicable or desired in all passive sensor applications. Therefore, passive wireless sensors that operate at lower frequencies are desired.

BRIEF DISCLOSURE

An exemplary embodiment of a passive wireless sensor includes an antenna. The antenna receives a combined signal that includes a generally low frequency modulating signal modulated on a generally high frequency carrier wave. A demodulator receives the combined signal and extracts the modulating signal. A transducer receives the extracted modulating signal and produces an output signal with a time delay indicative of a property to be sensed. A modulator receives the output signal and the generally high frequency carrier wave. The modulator modulates the output signal onto the high frequency carrier wave to create a combined output signal. The combined output signal is broadcast by the antenna.

An exemplary embodiment of a passive wireless sensor includes an antenna that receives the combined signal. The combined signal includes a low frequency modulating signal between 0.1 MHz and 40 MHz and a high frequency carrier wave. A demodulator receives the combined signal and extracts the modulating signal from the combined signal. An ultrasonic flow sensor receives the extracted modulating signal at a first transducer secured to a conduit and produces an output signal at second transducer secured to the conduit with a time delay indicative of a flow rate through the conduit. A modulator receives the output signal from the second transducer and the high frequency carrier wave. The modulator creates a combined output signal which is broadcast by the antenna.

An exemplary embodiment of a wireless sensing system includes a passive wireless sensor, a radio frequency (RF) transmitter, and an RF receiver. The passive wireless sensor includes an antenna that receives a combined signal that includes generally low frequency modulating signal modulated on a generally high frequency carrier wave. The passive wireless sensor includes a demodulator that receives the combined signal and extracts the modulating signal. The passive wireless sensor includes a transducer that receives the extracted modulating signal and produces an output signal with a time delay indicative of a property to be sensed. The passive wireless sensor includes a modulator that receives the output signal and the generally high frequency carrier wave and modulates the output signal onto the high frequency carrier wave to create a combined output signal broadcast by the antenna. The RF transmitter includes a modulator which combines the modulating signal and the carrier wave into the combined signal and transmits the combined signal to the antenna. The RF receiver receives the combined output signal broadcast by the antenna. A value of the property to be sensed is calculated from the output signal extracted form the combined output signal.

DETAILED DISCLOSURE

Figure 1:
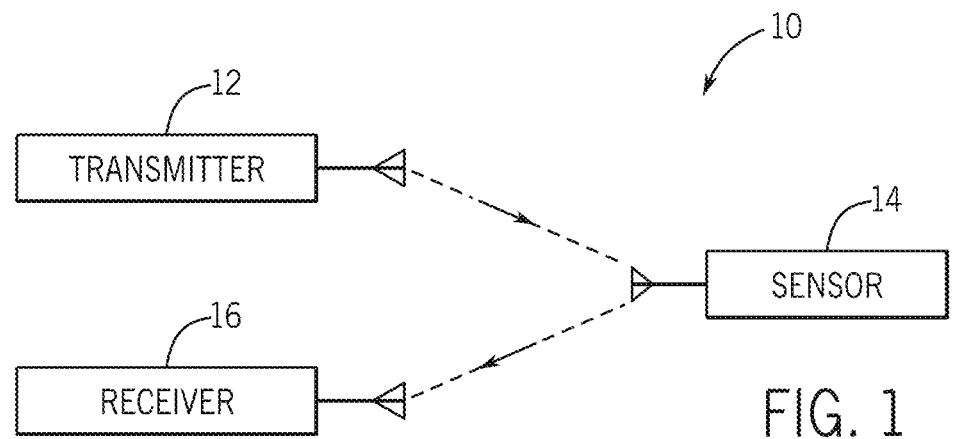
FIG. 1 is a schematic diagram that depicts the operation of a wireless sensor.

The present disclosure is related to remotely read, passive, wireless sensors. In a merely exemplary embodiment, a transmitter sends a radio frequency (RF) interrogating signal to the sensor. The interrogating signal is modified by the circuitry of the sensor in a manner that is related to one or more conditions (e.g. temperature or flow) to which the sensor is designed to sense. The sensor transmits back the modified interrogating signal which is received by an RF receiver. Further processing of the returned modified interrogating signal can reveal information about the parameter that is sensed. FIG. 1 depicts an exemplary embodiment of a remotely read, passive wireless sensor system 10. In the sensor system 10 a transmitter 12 is used to send a radio frequency (RF) interrogating signal to the sensor 14. The sensor 14 modifies the interrogating signal in a manner relative to a condition or parameter to be sensed and transmits the modified interrogating signal. The modified interrogation signal is received by an RF receiver 16. The modified interrogation signal sent back by the sensor 14 contains information about the condition or parameter that is being sensed. In an embodiment, the transmitter 12 and the receiver 16 are located in a single interrogation device (not depicted). In embodiments, such interrogation device may be brought within signal proximity of the sensor 14 and the sensor 14 passively operated and read as described herein.

Figure 2:
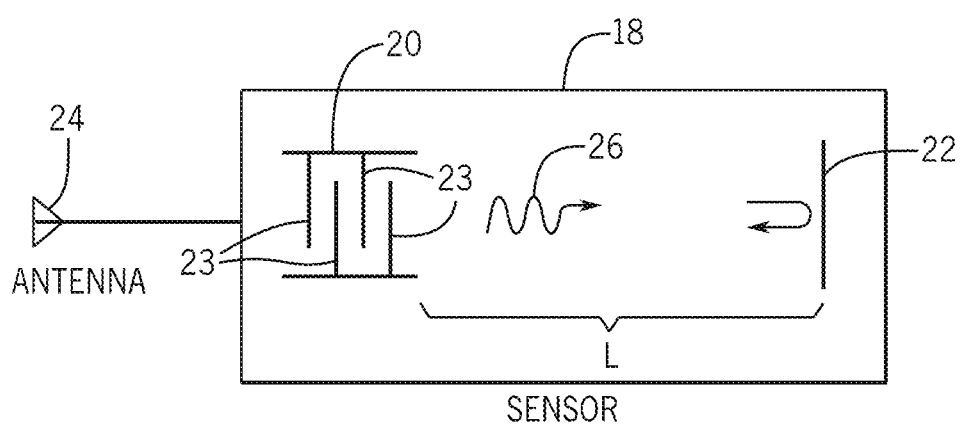
FIG. 2 is a block diagram of an exemplary embodiment of a surface acoustic wave (SAW) wireless sensor.

In addition to the passive wireless sensors as described in further detail herein, another example of the sensor 14 is a surface acoustic wave (SAW) device that can be used as a wireless sensor. An exemplary embodiment of SAW sensor 18 is depicted in FIG. 2. The SAW sensor 18 includes an interdigital transducer (IDT) 20 and a reflector 22. The reflector is located at a distance L from the IDT 20. The IDT 20 is connected to a suitable antenna 24 which communicates with the remote transmitter and receiver (exemplarily depicted in FIG. 1). The transmitter 12 (FIG. 1) sends an RF pulse to the SAW sensor 18. When the RF pulse is received by the antenna 24, the RF pulse produces a voltage across a plurality of electrodes or fingers 23 of the IDT 20. This voltage generates a surface acoustic wave 26 which travels towards the reflector 22. When the wave 26 reaches the reflector 22 a portion of the wave 26 is reflected back to the IDT 20. The reflected portion reaches the IDT 20 after time delay $t_d=2$ L/v, where v is velocity of the surface acoustic wave. The value of v in most solids is around 3000 m/s. So if the distance L=3 mm, then $t_d$ will be approximately 2 μs. When the reflected signal reaches the IDT 20, the reflected signal generates a voltage across the IDT 20. Since the IDT 20 is connected to the antenna 24, the antenna 24 will now radiate an electromagnetic wave which can be detected by the receiver 16 (FIG. 1). In such an embodiment, the receiver receives a signal after a time delay $t_d$.

The embodiment of the SAW sensor 18 depicted in FIG. 2 may be used in an embodiment as a temperature sensor. As a non-limiting example, if the temperature of the device is changed, the time delay $t_d$ will change. Therefore by measuring the change in time delay in the signal transmitted from the antenna 24, the temperature of the sensor 18 can be determined. The sensor 18, as well as other embodiments as disclosed herein is passive in that the sensor 18 does not require a battery or other on-board power source for operation in the manner described.

Wireless sensors that use a SAW device as the sensing element typically operate at frequencies in the 300 MHz to 3 GHz range. However, in other applications, alternative acoustic wave sensors may be used to sense the parameter of interest. Some such acoustic wave sensors operate at lower frequencies, typically in the low MHz or KHz ranges. In one embodiment this range is between 1 MHz-300 MHz. In another embodiment this range may be frequencies less than 40 MHz. in still further embodiments, sensors may operate at frequencies in the kHz range, for example between 10 KHz-1000 KHz. Such an embodiment may exemplarily be used in air or other gas sensors.

The wireless techniques used with the high frequency SAW devices, described herein, cannot be directly used with these low frequency acoustic wave sensors. The physical size of an antenna, in most cases, is inversely proportional to the operating frequency of the antenna, therefore, an antenna will become physically very large at low MHz frequencies. In application to wireless sensors, this physical size can overwhelm physical constraints on sensor package size. In order to accommodate a reduction in antenna size, new solutions in passive wireless sensor circuitry are required and presented herein.

Figure 4:
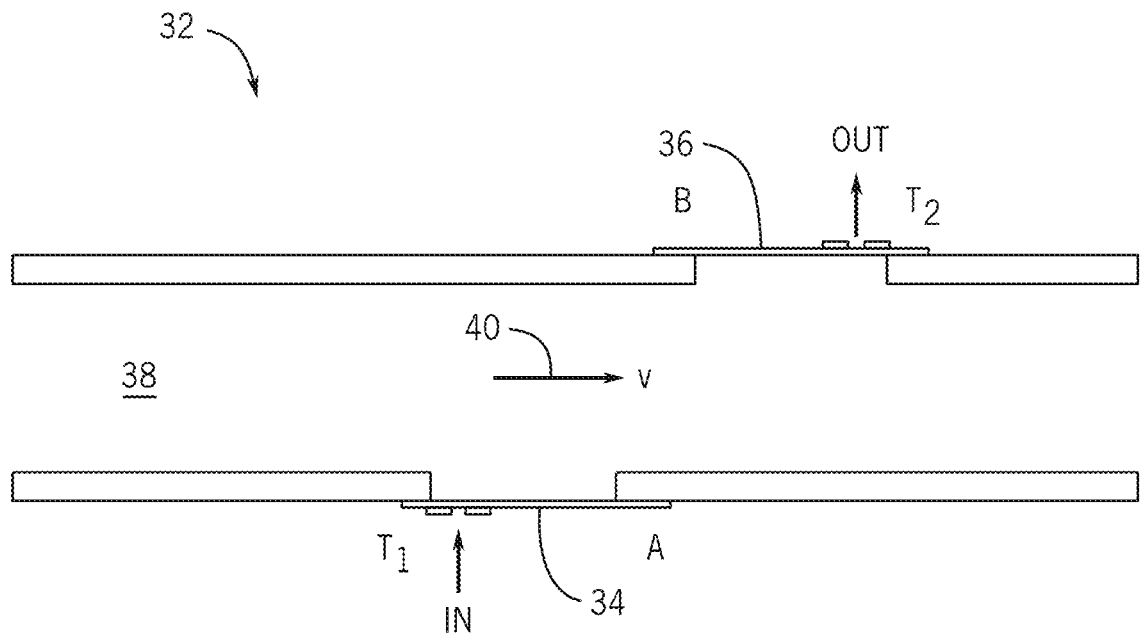
FIG. 4 depicts an embodiment of an ultrasonic flow meter.

An exemplary embodiment of a sensor configured for use and application as an ultrasonic flow meter will be described in further detail herein. It is to be noted that this description is merely exemplary and similar configurations may be made, including for other uses and applications and considered within the scope of the present disclosure. An ultrasonic flow meter is an acoustic wave sensor that is one example of an instrument that uses ultrasonic waves to measure the flow rate of fluids. FIG. 4 depicts an exemplary embodiment of an ultrasonic flow meter 32. The ultrasonic flow meter 32 includes a first transducer 34 and a second transducer 36 placed on opposing sides of a conduit 38 through which a fluid is flowing exemplarily in the direction of arrow 40 at a velocity, V.

In an exemplary embodiment, the first transducer 34 and the second transducer 36 include a plate upon which an electrode or electrodes are printed. The pattern of the electrode printed on the plate, when energized by the signal applied to the first electrode produces a plate wave. The plate wave is transferred from the first transducer 34 into the fluid flowing through the conduit 38 as a bulk wave through the fluid. As will be described in further detail herein, in a no-flow condition of the fluid within the conduit 38, the bulk wave will travel through the fluid in an even manner until the bulk wave reaches the plate of the second transducer 36. The bulk wave produces plate waves in the plate of the second transducer which are converted to an electrical signal by electrodes printed on the plate of the second transducer 36, producing the output signal.

Figure 3:
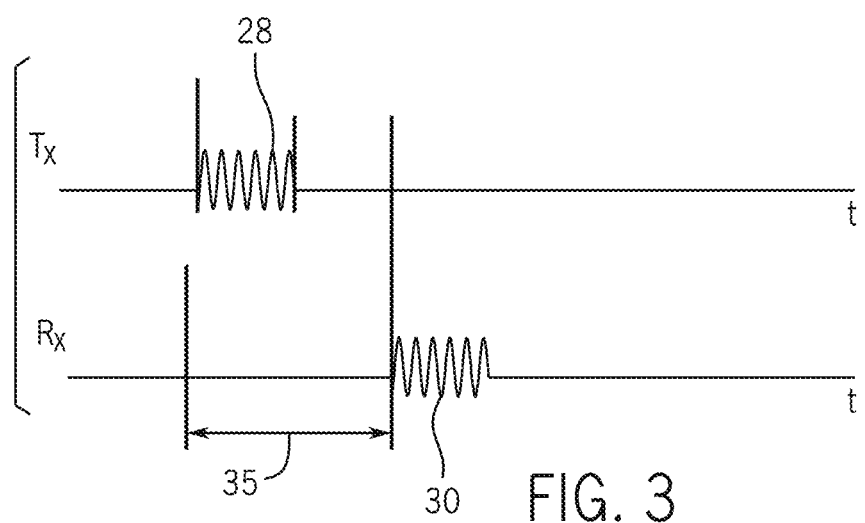
FIG. 3 depicts an exemplary embodiment of a signal received at a first transducer of an acoustic wave sensor and a signal received at a second transducer of the acoustic wave sensor.

An input electrical signal is applied to the first transducer 34 at time ($t_1$) which results in the generation of an ultrasonic wave which travels through the fluid and is received by the second transducer 36 at time ($t_2$). The time taken by the wave to travel from the first transducer 34 to the second transducer 36 ($t_2-t_1$), the transit time, is a function of the flow velocity (V) of the fluid. Thus the transit time, and any changes in the measured transit time are indicative of the flow velocity (V) and other related flow parameters. The signals as exemplarily exist at the first and second transducer are exemplarily depicted in FIG. 3. The upper trace 28 is generally exemplary of the input signal applied to the first transducer 34, while the lower trace 30 is generally exemplary of the output received from the second transducer 36. The transit time 35 is the time that the signal requires to pass between the transducers.

Depending on the diameter of the conduit 38 and various other factors including, but not limited to the fluid being sensed and the temperature, a time delay during a no-flow condition between the input and output signals is expected. This expected time delay may exemplarily be determined during set up or calibration of the sensor. This time delay may exemplarily, but not limited to about 10 μs, while other embodiments may be higher or lower. In a non-limiting embodiment, the direction and velocity of the flow of the fluid in the conduit can result in a change in time delay of ±0.2 μs from the original no-flow expected time delay. Exemplarily the flow of fluid in the conduit will cause a Doppler shift in the bulk wave produced in the fluid flowing in the conduit. Therefore, when the second transducer is down stream (based upon the direction of flow), the flow of fluid will reduce the transit time of the bulk wave (e.g. 19.8 μs). When the second transducer is up stream of the first transducer, the flow of fluid will increase the transit time of the bulk wave (e.g. 20.2 μs). In other embodiments this variation in the time delay due to flow velocity may be more or less or other size ranges of variability. In exemplary embodiments, if controlled for other factors, including, but not limited to those already mentioned above, this change in the time delay can be indicative of the flow velocity in the conduit. The ultrasonic flow meter 32 may use frequencies in the low MHz range (e.g. between 0.5 MHz and 40 MHz). In a still further exemplary embodiment, the ultrasonic flow meter 32 may use frequencies between 0.5-5 MHz. In still further exemplary embodiments, the ultrasonic flow meter may use frequencies as low as 0.1 MHz, or a range between 0.1 MHz and 40 MHz.

In an exemplary embodiment of the ultrasonic flow meter 32, the time of flight or transit time of the signal across the fluid flowing in the conduit is measured by first applying the signal to the first transducer and collecting the output from the second transducer followed by reversing the signal and applying the input signal to the second transducer while collecting the output signal from the first transducer. A difference between the measured transit times is taken which will reflect the impact of the fluid velocity flowing in the conduit on the bulk wave produced within the conduit by the respective signals as explained above. In one such embodiment, this time of flight may exemplarily be measured using a TDC-GP22 chip manufactured by ACAM-Messelectronic.

It will be recognized that in an embodiment, the difference between the two transit times will double the effect of the fluid flow on the measured transit time. Therefore, in embodiments, the difference between the transit time, or in other embodiments one-half the difference, is calibrated to be indicative of the velocity of the fluid flow through the conduit.

Figure 5:
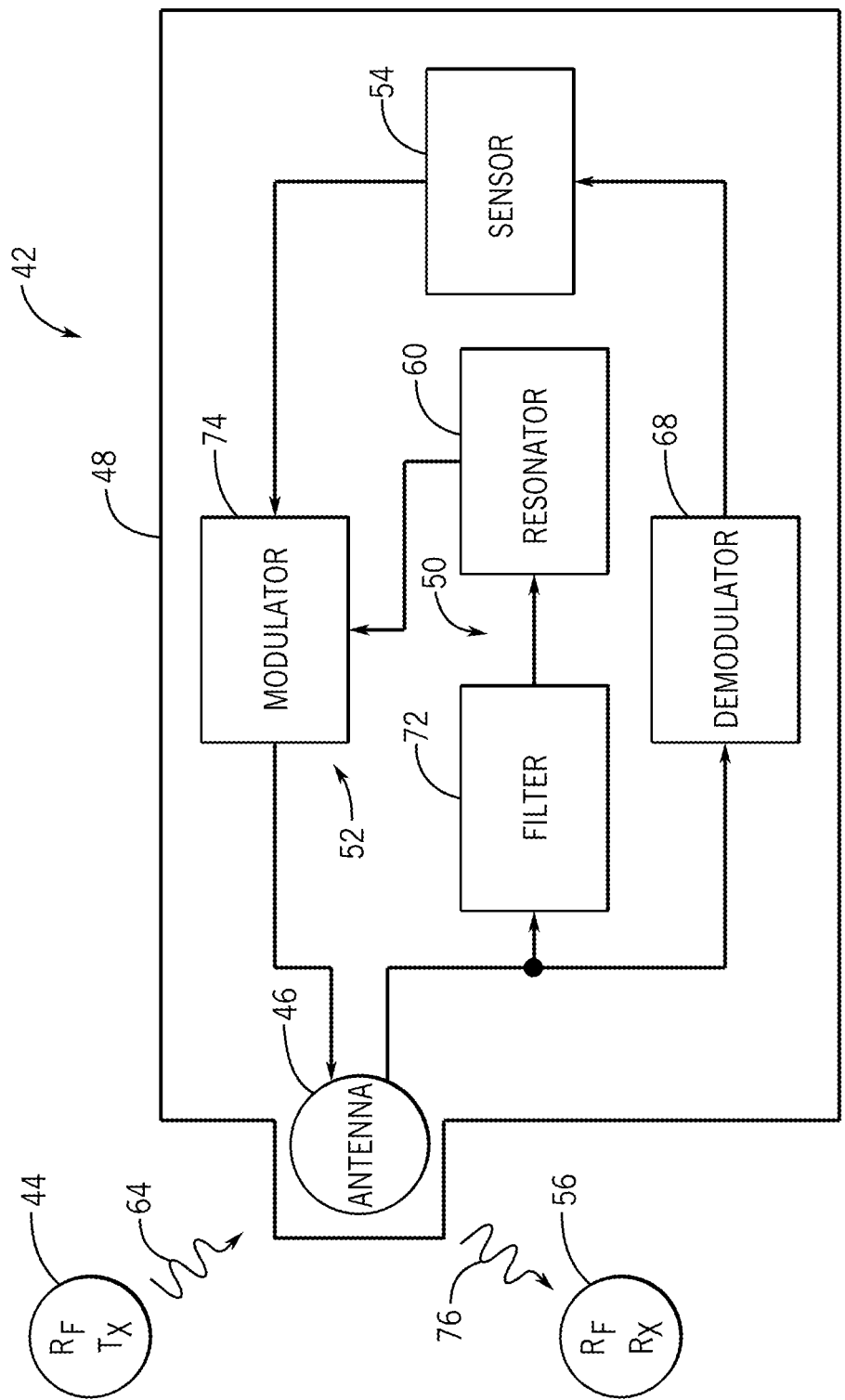
FIG. 5 is a system diagram of an embodiment of a passive wireless sensor system as disclosed herein.
Figure 17:
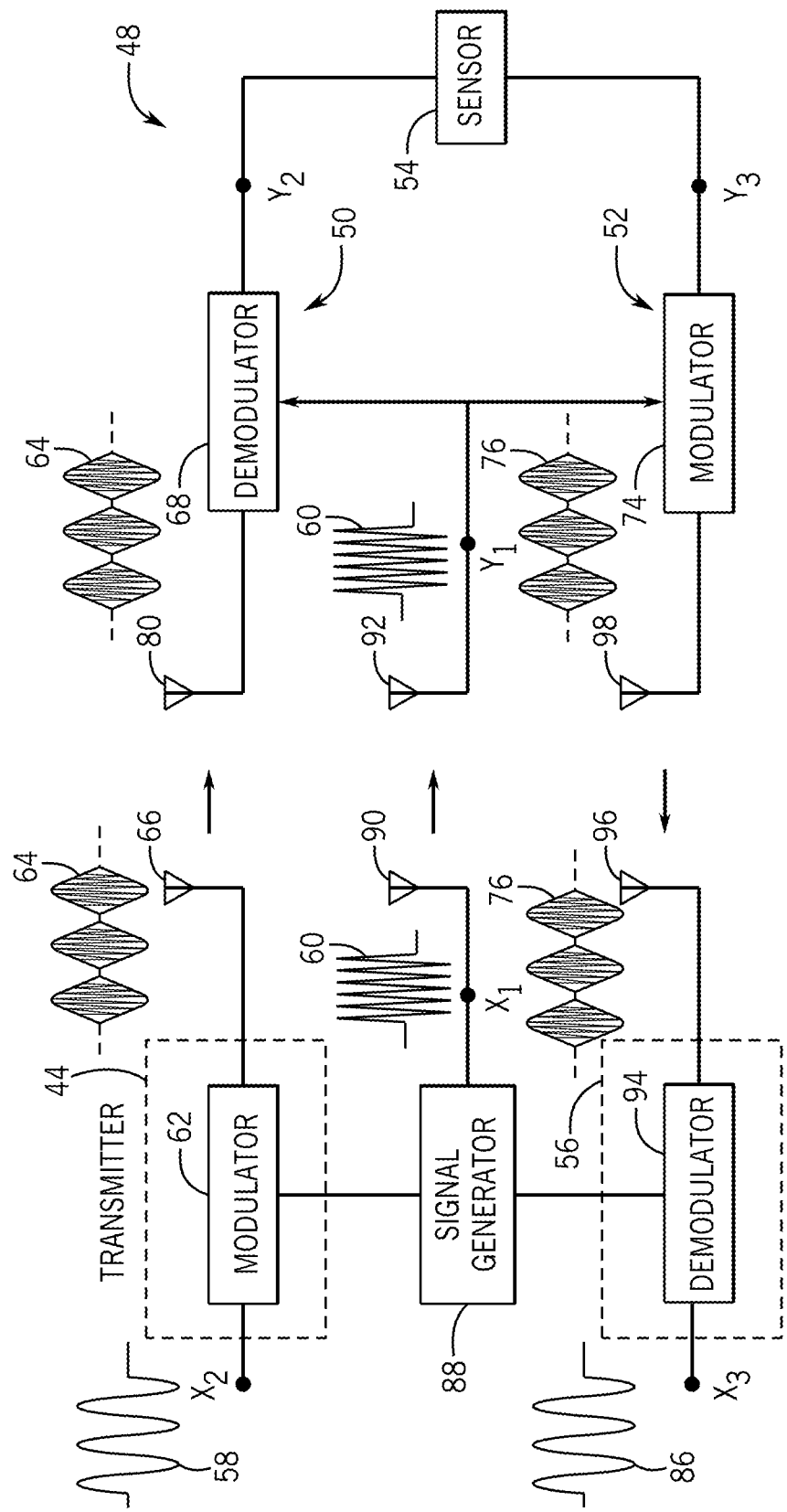
FIG. 17 depicts an exemplary embodiment of a passive wireless sensor system.

FIG. 5 is a system diagram of an exemplary embodiment of a passive wireless sensor system 42 as disclosed in further detail herein. The system 42 includes a radio frequency (RF) transmitter 44 which is depicted and described in further detail with respect to FIG. 6. The RF transmitter 44 produces a combined signal 64 which includes low frequency signal modulated onto a high frequency carrier wave which is transmitted to an antenna 46 of a passive wireless sensor 48. The passive wireless sensor 48 includes a front end 50 which is also exemplarily depicted in FIG. 7 and described in further detail in reference thereto. The passive wireless sensor 48 further includes a back end 52 which is exemplarily depicted in FIG. 8 and described in further detail herein with reference thereto. While the embodiment of the wireless sensor 48 depicts a single antenna 46, in alternative embodiments, separate antenna are connected to each of the front end 50 and the back end 52. FIG. 17 depicts an exemplary embodiment of a multiple antenna implementation of the passive wireless sensory system described with respect to FIGS. 5-8 and 12. In FIG. 17, an antenna 80 connected to the front end 50 receives the combined signal 64 from the transmitter 44. The antenna 98 connected to the back end 52 transmits the signal 76 back to the receiver 56. The front end 50 of the passive wireless sensor 48 is separated from the back end 52 of the passive wireless sensor 48 by a sensor 54. The sensor 54 may exemplarily be an acoustic wave sensor in the form disclosed above with respect to FIG. 4. In a still further embodiment, the transducer 54 is an ultrasonic flow meter 32 as depicted in FIG. 4. However, it will be understood that alternative transducers, particularly those that employ a frequency less than 40 MHz in the sensing of a parameter may be used within the scope of the present disclosure. Returning to the description of FIG. 5, the passive wireless sensor system 42 further includes an RF receiver 56 that receives a signal 76 transmitted by the antenna 46 as described in further detail herein. A computer processor and/or other signal processing circuitry (not depicted), but exemplarily described above, may be connected to the RF receiver 56 and used in accordance with the disclosure found herein to process the received signal 76 in order to calculate a value of the parameter sensed by the passive wireless sensor 48. Such signal processing may include extracting the output signal from the transmitted carrier wave, such as with a demodulator or a filter, calculating the time delay in the output signal, and determining a component of the time delay attributable to the flow velocity. This may be exemplarily achieved by knowing an expected no-flow time delay. Additionally, this can be achieved by taking the difference between the transit times of signals applied to the sensor in both directions.

Figure 6:
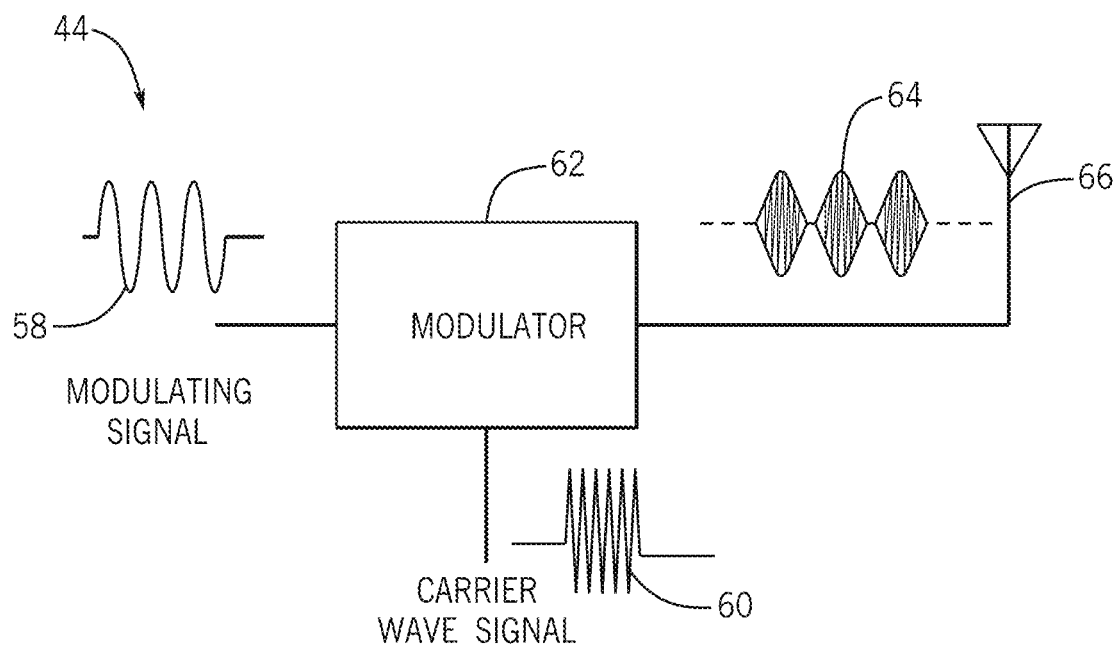
FIG. 6 depicts an embodiment of a transmitter exemplarily used with embodiments of a passive wireless sensor system.

In a merely exemplary embodiment as described herein with respect to FIGS. 4-8, an assumption is made that the first transducer 34 is to be excited by a 1 MHz RF pulse of duration 10 μs; the transit time for acoustic waves to travel across conduit 38 from the first transducer 34 to the second transducer 36 is 20 μs; and the high frequency carrier wave produced by the RF transmitter 44 used in the passive wireless sensor system 42 is of frequency 300 MHz. Referring to FIGS. 5 and 6, the RF transmitter 44 receives both the 1 MHz low frequency modulating signal 58 required to excite first transducer 34 and the 300 MHz high frequency carrier wave 60 at a modulator 62. The modulator 62 modulates the modulating signal 58 on the carrier wave 60 and this combined signal 64 is transmitted by an antenna 66 of the RF transmitter 44.

Figure 7:
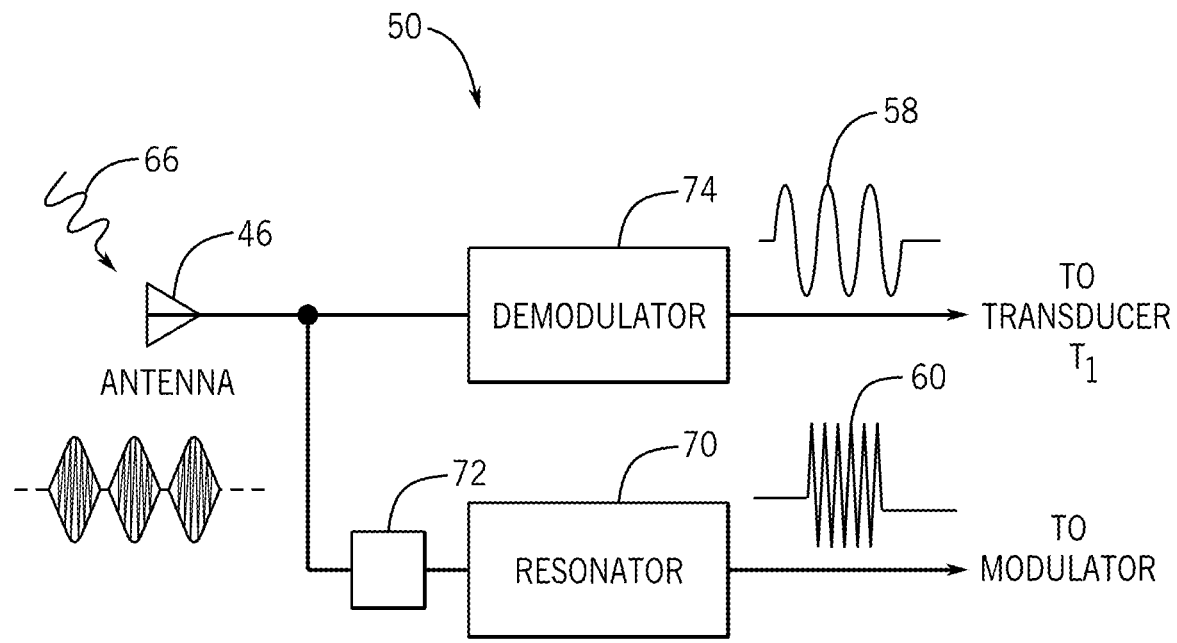
FIG. 7 depicts an embodiment of a front end of an embodiment of a passive wireless sensor.

Next, referring to FIGS. 5 and 7, the transmitted combined signal 64 is picked up by the antenna 46 of the passive wireless sensor 48. The combined signal 64 is demodulated with a demodulator 68 in order to recover the original low frequency modulating signal 58. This low frequency signal is applied to the sensor 54 of the passive wireless sensor 48. As explained above with respect to FIG. 4, after a certain time delay (exemplarily 20 µs in a no-flow condition as set forth above for this example) a first output signal from the sensor 54 will be received and provided to the back end 52 of the passive wireless sensor 48, which will be described in further detail herein. The first output signal will have a first transit time different from the no-flow transit time based upon the flow direction and velocity in the conduit. Also in embodiments, the signal is also applied across the sensor 54 in a reversed direction, to obtain a second output single with a second transit time.

As also will be described in further detail herein, the passive wireless sensor 48 must transmit the modified output signal from the transducer 54 back to the RF receiver 56. In order to do so, the output signal from the transducer must be recombined with the carrier wave from the combined signal 64. The high frequency carrier wave is made available for transmission of the transducer output, from a storage device, exemplarily a resonator 70, which stores the carrier frequency. Exemplarily, the storage device stores the high frequency carrier wave for approximately at least the expected time delay of the modulating signal through the transducer 54 before outputting the carrier wave 60 to the back end 52 of the passive wireless sensor 48. In an alternative embodiment, the combined signal 64 is of a sufficient length such that no resonator is needed, and later received portions of the combined signal 64 carrier wave are used to transmit the output signal (s).

In an exemplary embodiment as depicted in FIGS. 5 and 7, the front end 50 may further include a band pass filter 72 that specifically only passes the high frequency carrier wave (e.g. 300 MHz) to the resonator 70. While the resonator 70 has been described herein as one example of a suitable storage device, it will be recognized that other suitable storage devices may be used within the scope of the present disclosure including, but not limited to, a delay line or a high quality factor (high Q) resonator. In a still further embodiment, as described above, if no resonator 70 is used, the filtered signal may be provided directly to the modulator 74.

Figure 8:
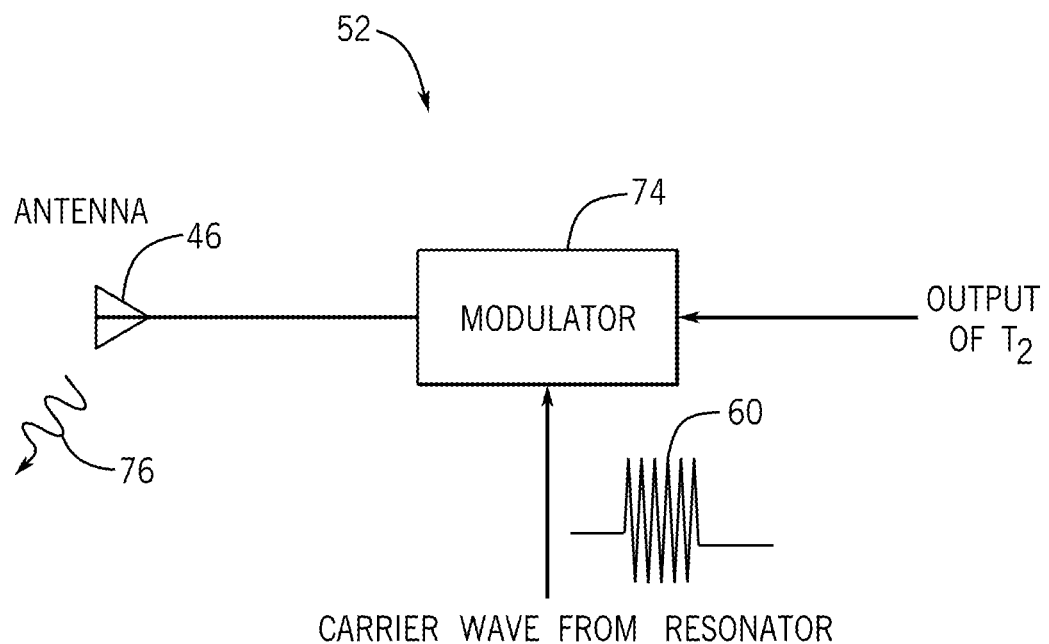
FIG. 8 depicts an exemplary embodiment of a back end of an embodiment of a passive wireless sensor.

Referring to FIGS. 5 and 8, the back end 52 of the passive wireless sensor 48 is configured to modulate the output signal from the transducer 54 onto the high frequency carrier wave 60 as stored at the resonator 70 and provided to the modulator 74. The modulator 74 performs this modulation in order to produce a combined output signal 76 that is transmitted from the antenna 46.

Thus, by the embodiment of the passive wireless sensor system 42 as described above, the size of the antenna 46, or in embodiments using two antennas, antennas may be limited to desirable physical dimension for use in conjunction with a selected high frequency carrier wave produced by the RF transmitter 44 and received by the RF receiver 56, while the required low frequency is provided to the input of the sensor 54 in order to obtain meaningful results from the sensor 54, which may exemplarily be an ultrasonic flow sensor. It is to be noted that in an embodiment of the passive wireless sensor system 42 as described herein, the temporal length of the modulating signal as used by the sensor 54 may be limited to a suitable temporal length as required to obtain meaningful and reliable parameter sensing from the transducer. In one merely exemplary embodiment, such a length may be between 8 µs and 10 µs; however, it will be recognized that a variety of suitable temporal lengths may be used and may also be required based upon the specific condition to be sensed by a particular embodiment of a passive wireless sensor.

For the purposes of disclosure, in an exemplary embodiment, the RF transmitter 44 only produces a combined signal of the length required in order to obtain the result from the transducer of the passive wireless sensor. In some embodiments, this result may be a first output signal. Therefore, in an embodiment, the combined signal sent by the RF transmitter is 10 µs in length. These signals may be transmitted at the desired interval for sampling the condition to be sensed. In the example as used herein, the expected delay of the signal across the transducer may be 20 µs and the condition to be sensed, exemplarily flow velocity may impact the delay by ±0.2 µs. Stated in another way, in exemplary embodiments, the flow velocity may contribute up to about 1% variation from the expected delay. Therefore, in an embodiment, if the input signal into the sensor 54 is provided at time T=0 µs, then the resonator provides the carrier signal to the modulator beginning at time T=19.8-20.2 µs and the provision of the carrier frequency from the resonator to the modulator will extend until T=30.2 µs. Such an embodiment minimizes the energy consumption required by the transmitter by only producing a transmitted combined signal for the necessary length to achieve the measurement by the passive wireless sensor.

In an alternative embodiment, the carrier wave signal is continuously provided to the passive wireless sensor while the modulated carrier wave combined signal is only provided at the intervals for sensing the parameter. This is, for example, depicted in FIG. 17. In such embodiments, the high frequency carrier wave need not be stored in a resonator, but rather is available both for use in extracting the low frequency signal to be provided to the transducer, as well as for modulating the output from the transducer for transmission to the RF receiver. As stated above, in one example of this embodiment the filter 72 (FIG. 5) operates to provide only the high frequency carrier wave to the modulator 74.

Figure 12:
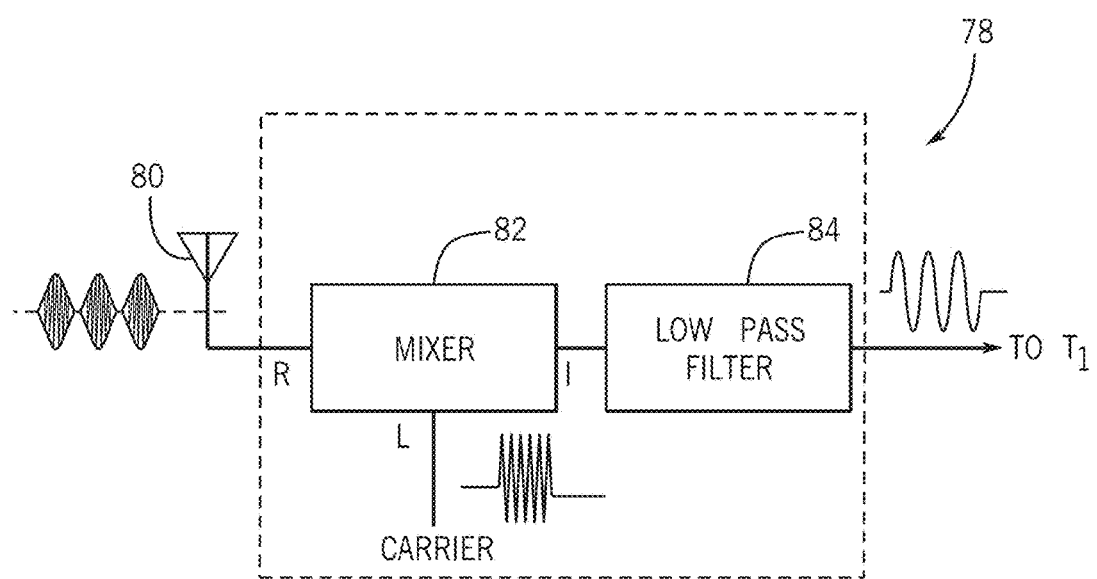
FIG. 12 is a system diagram of an embodiment of a demodulator circuit as may be used in an alternative embodiment of the wireless sensing system.

FIG. 12 depicts an exemplary embodiment of a demodulator circuit 78 as may be used in an alternative embodiment of the wireless sensing system as disclosed herein. In the demodulator circuit 78 depicted in FIG. 12, the modulated signal is received by an antenna 80 which is provided to the R port of a frequency mixer 82. The received carrier wave signal is applied to the L port of the frequency mixer 82. The frequency mixer 82 outputs a signal through the I port to a low pass filter 84. In an embodiment, the low pass filter passes the low frequency signal that can be used to excite the transducer, which is output from the demodulator 78.

While not depicted, in such an embodiment, the modulator may similarly receive the output signal from the transducer as well as the carrier wave signal such that the output signal is modulated onto the high frequency carrier wave for transmission from the passive wireless sensor to the RF receiver.

In still further embodiments, the wireless sensor may be constructed as a lower power sensor, a minimal power source, or potentially other forms of power transmission or generation, including wireless power transmission or power transmission by photovoltaic cells may be incorporated into the sensor and may be used to amplify the output signal from the transducer in order to facilitate the modulation of the output signal and transmission of the modulated signal to the RF receiver.

Thus, by embodiments of the apparatus and techniques as described above, a transducer is able to operate at a normal low frequency, while the transmission of the sensed signal may be performed at a much higher frequency resulting in a reduced physical size of an antenna associated with the wireless sensor.

Figure 9:
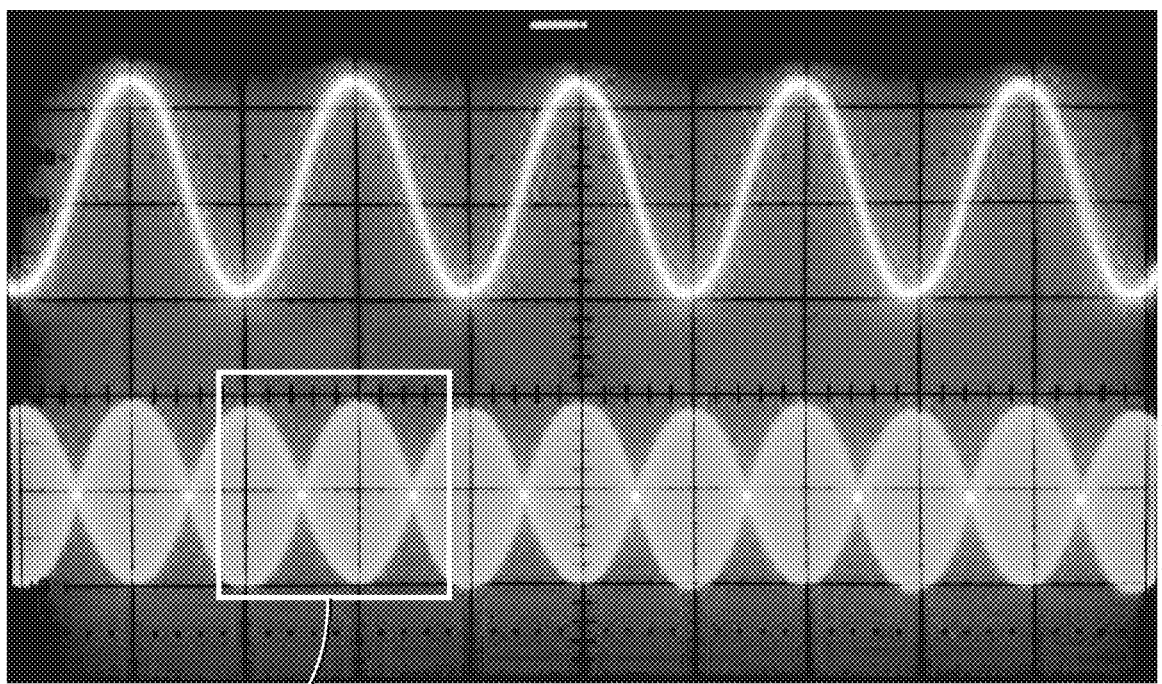
FIG. 9 exemplarily depicts oscilloscope outputs showing operation of a modulator in accordance with an embodiment as disclosed herein.
Figure 10:
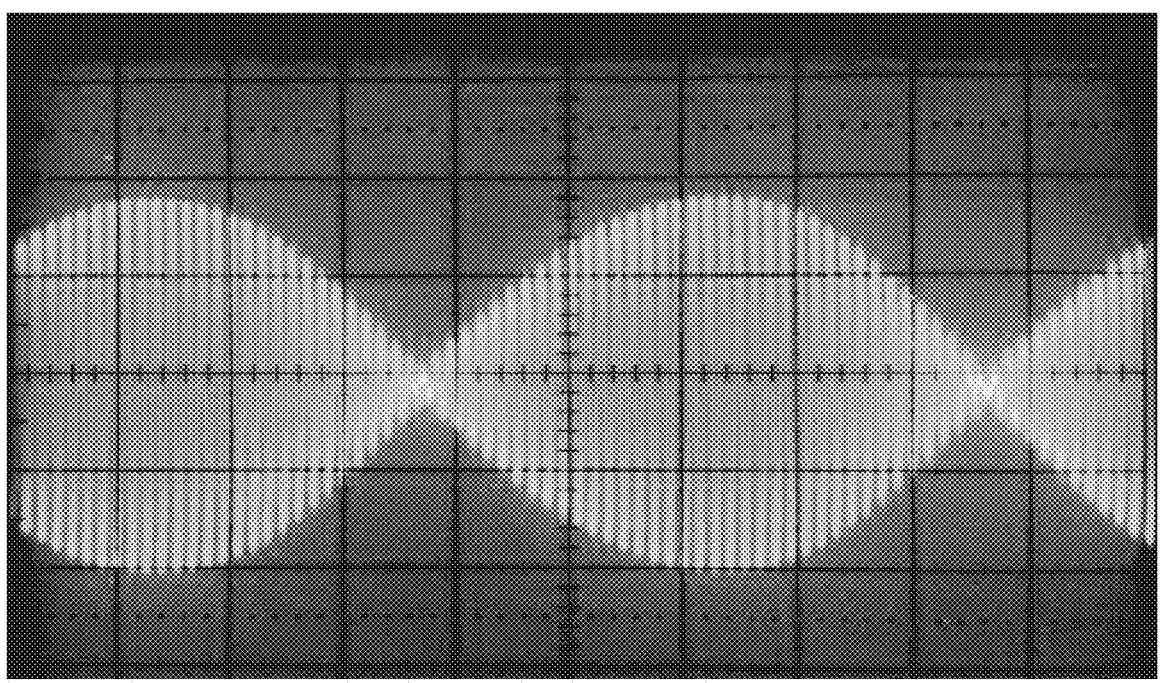
FIG. 10 is an enlarged view of the modulated signal as identified in segment A in FIG. 9.
Figure 11:
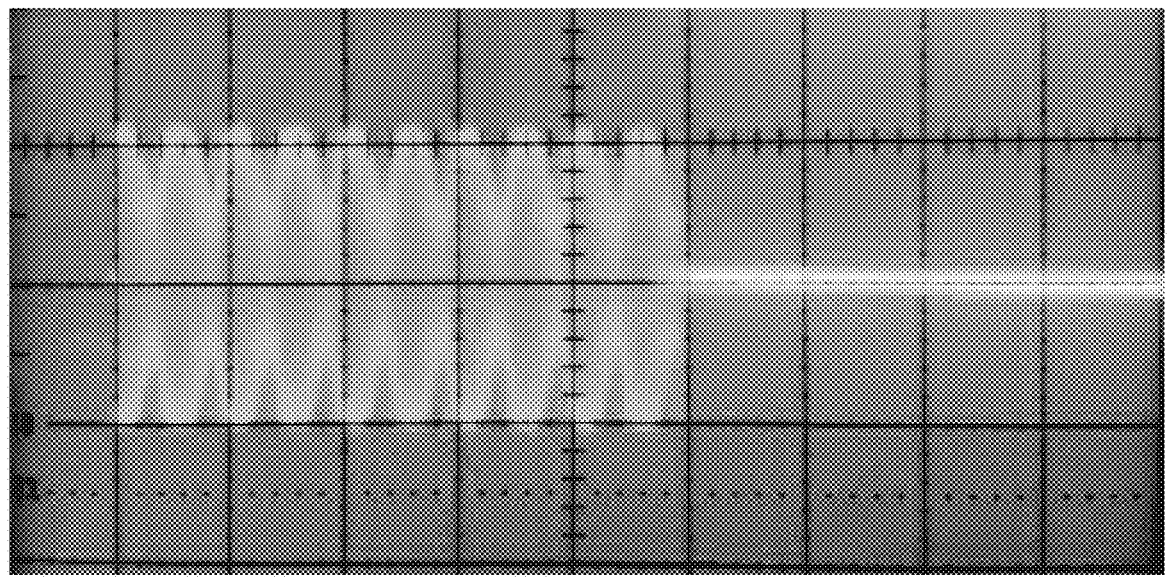
FIG. 11 exemplarily depicts oscilloscope outputs of a signal sent by a transmitter to a passive wireless sensor.

Experimental work done to date demonstrates features of the disclosure as provided above. This experimental work is described in further detail herein. Experimentally, the transmitter has been implemented using a frequency mixer. A low frequency tone burst that is required to excite a transducer is applied to the I port of a suitable frequency mixer. Exemplarily a suitable mixer may be a Mini-Circuits model ZAD-1-1 mixer. The high frequency carrier wave signal is applied to the L port of the mixer. Experiments have used carrier wave frequencies in the range of 75 to 450 MHz, although in practice and other experiments, significantly higher carrier wave frequencies including 500 MHz or greater may be used. The modulated signal is generated at the R port of the mixer. The various waveforms in the circuit are shown in FIGS. 9 through 11. The upper trace in FIG. 9 is the low frequency modulating signal, while the lower trace is the modulated signal. FIG. 10 shows an expanded time scale depiction of the segment of the lower trace of FIG. 9 denoted with the letter A. The carrier frequency can thus be clearly seen in FIG. 10. The modulated signal generated at the R port is shown in FIG. 11. This signal is fed to the antenna for transmission to the transducer which is exemplarily a flow meter as described above. The antenna at the flow meter picks up this signal. Once the antenna of the wireless sensor receives the modulated signal, the low frequency tone burst must be extracted. Exemplarily in experiments a circuit such as that depicted in FIG. 12 has been used.

Figure 13:
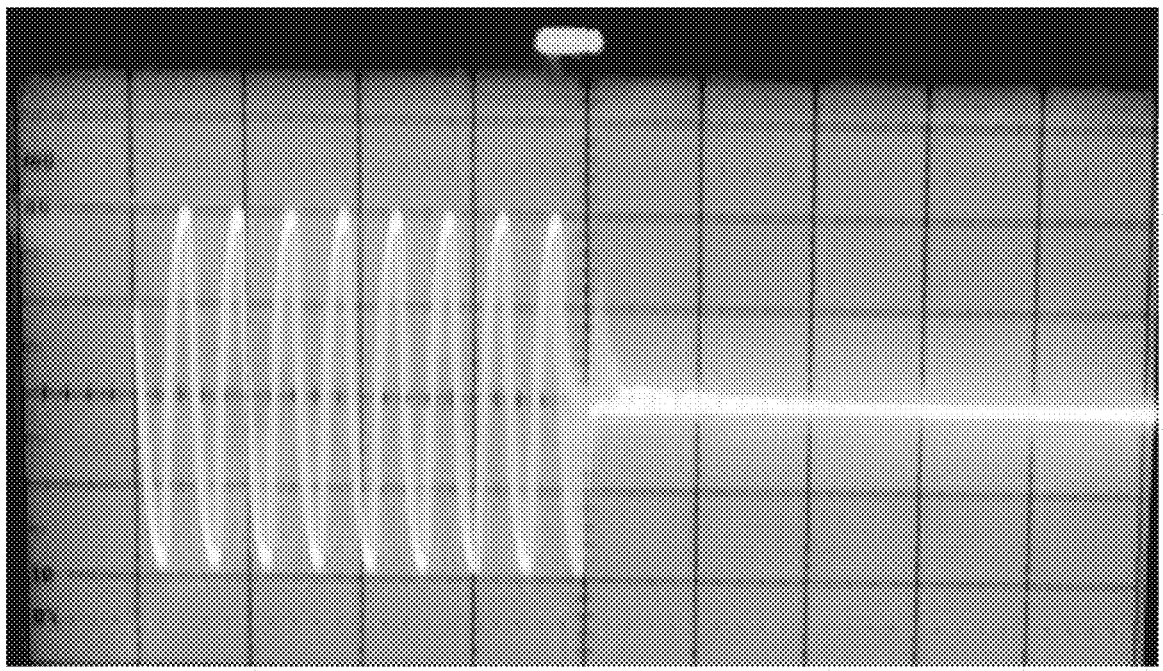
FIG. 13 exemplarily depicts oscilloscope outputs of a low frequency signal extracted from the interrogating signal by an embodiment of the wireless sensor.
Figure 14:
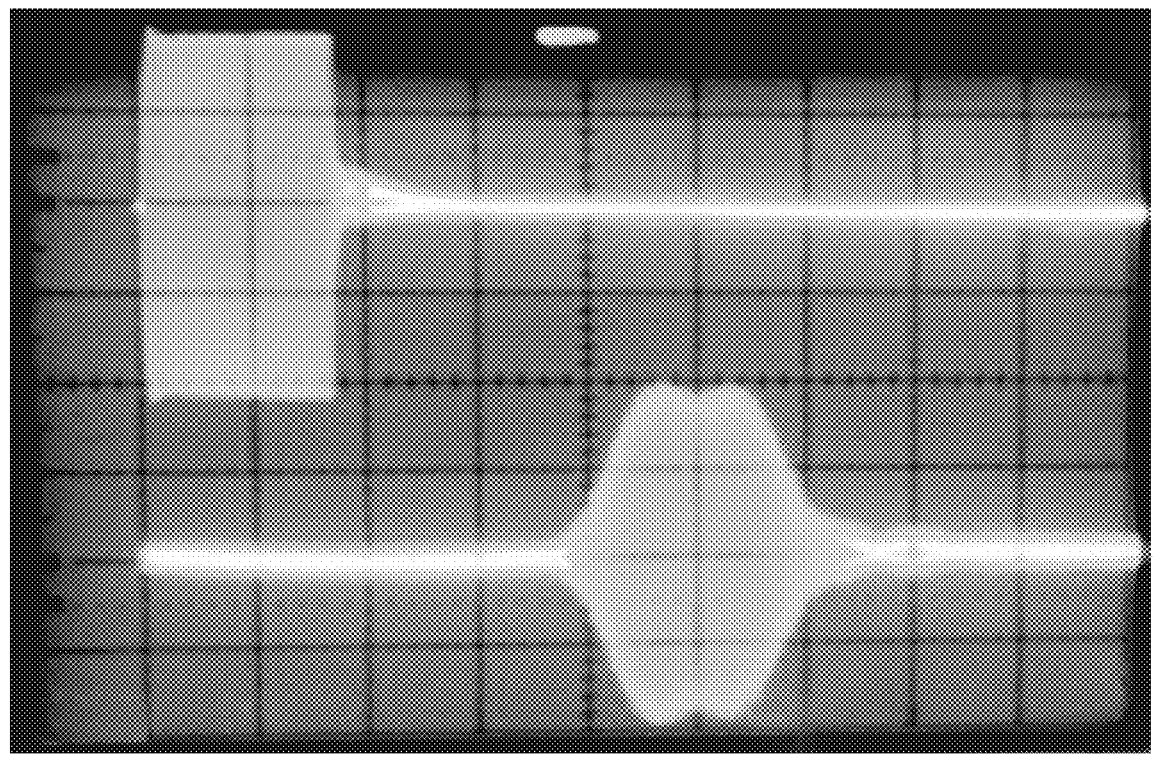
FIG. 14 exemplarily depicts oscilloscope outputs of a response of a wireless sensor excited in a wireless fashion by a remote transmitter.

FIG. 13 shows the output obtained from the low pass filter in an implementation of an embodiment of the circuit of FIG. 12. The exemplary first transducer generates an ultrasonic wave which travels through the fluid, and is picked up by the second transducer on the opposite wall of the flow tube. The results of this experiment are shown in FIG. 14. In FIG. 14, the upper trace is the signal applied to the first transducer, while the lower trace is the output obtained from the second transducer.

Figure 15:
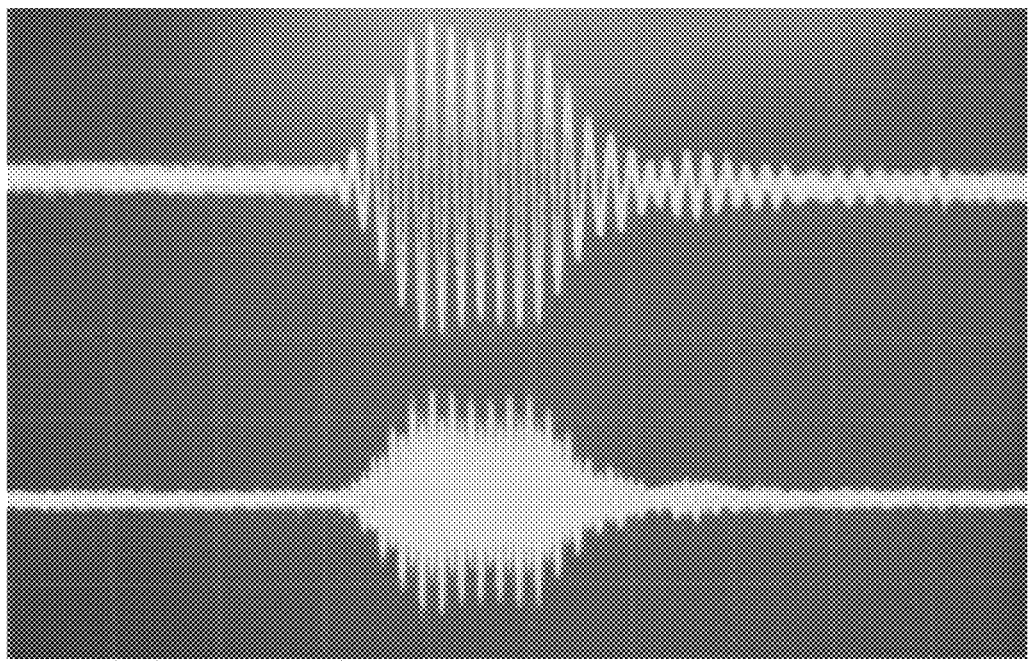
FIG. 15 exemplarily depicts oscilloscope outputs of a second transducer of an ultrasonic flow meter and a modulated output of the wireless sensor.

The output obtained from the second transducer as depicted in the lower trace of FIG. 14 must be sent back to the RF receiver 56 (FIG. 5). As described above, this output signal is modulated onto a high frequency carrier wave. An exemplary embodiment of this modulation is depicted in FIG. 15. In FIG. 15, the upper trace exemplarily depicts the output signal obtained from the second transducer 36 (FIG. 4), which is also the same signal as depicted in the lower trace of FIG. 14. The lower trace of FIG. 15 is the modulated signal as exemplarily output by the modulator 74 (FIGS. 5 and 8). The modulated signal depicted in the lower trace of FIG. 15 is transmitted from the antenna 46 of the wireless sensor 42 to the RF receiver 56 (FIG. 5).

Figure 16:
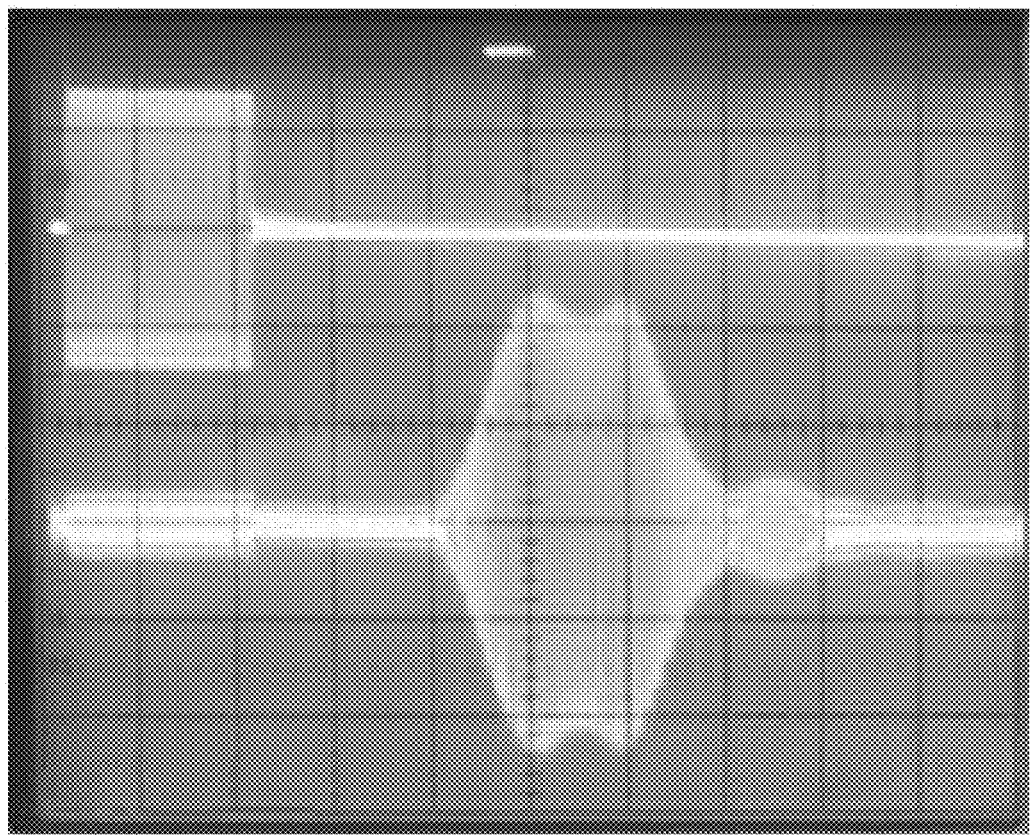
FIG. 16 exemplarily depicts oscilloscope outputs of an embodiment of the wireless sensor.

The operation of an exemplary embodiment of the wireless sensor system 42 (FIG. 5) is exemplarily depicted with reference to the signal traces depicted in FIG. 16. As shown in FIG. 16, the upper trace represents an example of the low frequency modulating signal 58 (FIG. 6) generated at the transmitter. This signal is applied to the first transducer 34 of the flow sensor 32. The lower trace depicted in FIG. 16 is the output ultimately obtained through processing at the receiver 56 (FIG. 5). As previously described, the time delay between the signals of these two traces is related to the flow rate of the fluid flowing through the flow sensor.

FIGS. 17-21 depict various embodiments of multi-antenna implementations of the wireless sensors as disclosed herein. FIG. 17, as mentioned above, depicts an implementation of the passive wireless sensor system in which the passive wireless sensor 48 includes multiple antennas. In FIG. 17, the transmitter 44 operates as described above to produce a combined signal 64, from a modulator 62 which modulates a low frequency signal 58 onto a high frequency carrier wave 60. The high frequency carrier wave 60 is produced by a signal generator 88 and provided to the modulator 62. The transmitter antenna 66 provides the combined signal 64 to a receiver antenna 80 of the passive wireless sensor 48. A signal generator antenna 90 provides the high frequency carrier wave 60 to a carrier wave input antenna 92. In this manner, the passive wireless sensor 48 can receive the high frequency carrier wave 60. The high frequency carrier wave 60 is provided to the demodulator 68 and used to demodulate the combined input signal 64. The demodulator 68 outputs the low frequency signal such that the signal at X2 and Y2 are the same. This low frequency signal is provided to the sensor 54. The output of the sensor 54 is represented at Y3 and is provided to the modulator 52. The high frequency carrier wave 60 received at the carrier wave input antenna 92 is also provided to the modulator 74 and used by the modulator 74 to modulate the output from the sensor 54 onto the high frequency carrier wave 60 to produce the combined output signal 76. Reply antenna 98 transmits the combined output signals 76 to the receive antenna 96. The combined output signal 76 is provided to a demodulator 94 of the receiver 56. The demodulator 94 also receives the high frequency carrier wave 60 from the signal generator 88 and the demodulator 94 uses the high frequency carrier wave 60 to demodulate the combined output signal 76 to arrive at the low frequency output signal 86 such that the signal at X3 matches the signal from Y3. In the embodiment depicted in FIG. 17, all three antenna pairs (66, 80; 90, 92; and 96, 98) are all transmitting the same frequency, namely the frequency of the high frequency carrier wave. In such an embodiment, effort may need to be taken to limit cross talk between antennas not in their respective pairs. One solution is to use highly directional antennas, however, this increases the physical size of the antenna and requires correct alignment between the antennas with respect to each other. Other solutions as described herein use multiple frequency bands to facilitate transmission between the antenna pairs.

Figure 18:
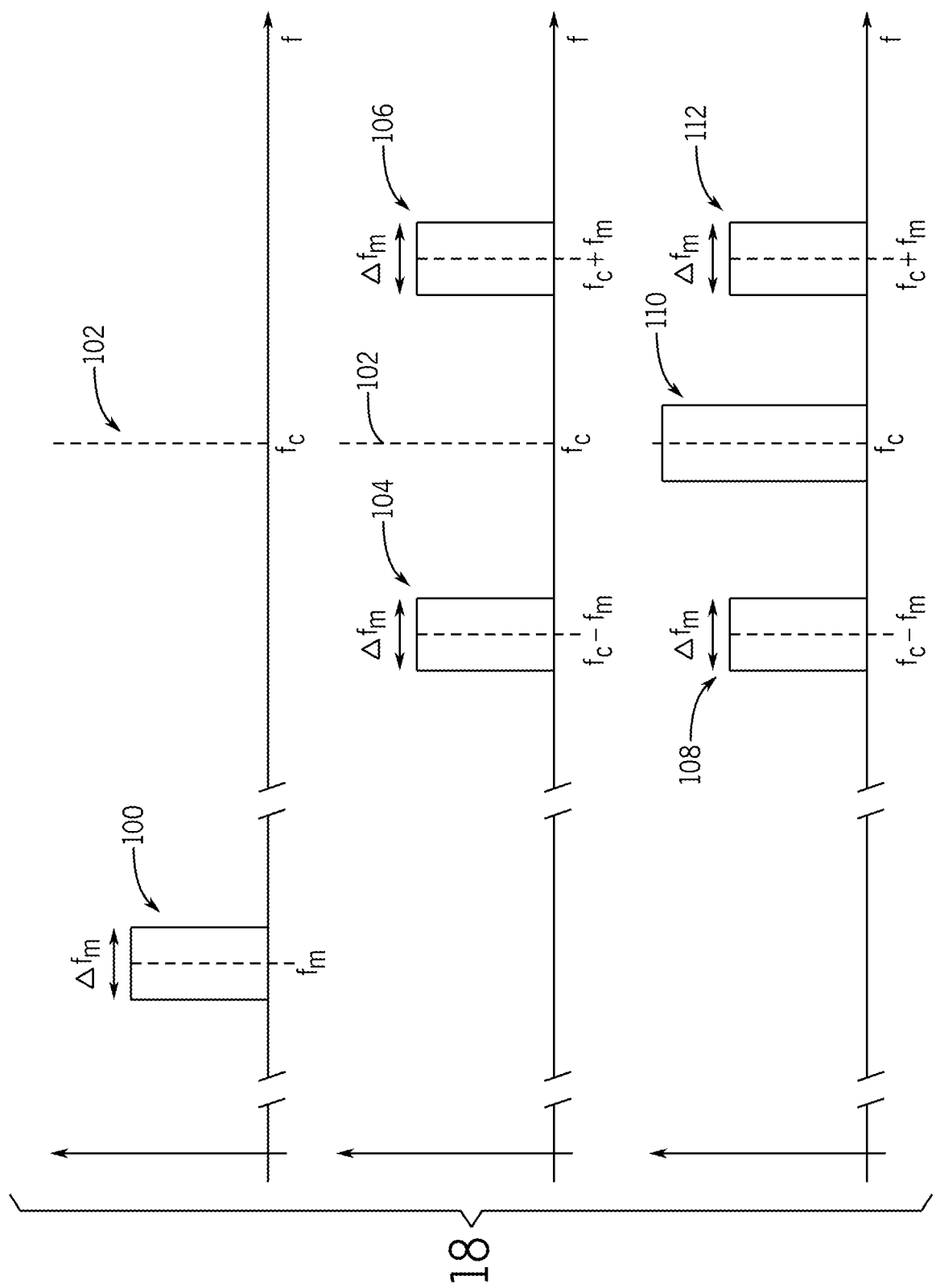
FIG. 18 depicts three graphs relating various signals and filter bandwidths as used in exemplary embodiments of the passive wireless sensor system.

FIG. 18 graphically depicts the signal processing concepts as used with respect to the embodiment as described in further detail herein.

The low frequency modulating signal is represented at 100 by a modulating signal with a center frequency fm and a frequency bandwidth Δfm. The carrier wave is represented at 102 by the carrier wave frequency fc. If amplitude modulation is used to create the combined input signal, the spectrum of the combined signal includes the carrier wave 102 along with two side bands. A lower sideband (LSB) 104 is centered at frequency (fc−fm) and has a frequency bandwidth of Δfm. An upper side band (USB) 106 is centered at frequency (fc+fm) and has a frequency bandwidth of Δfm.

Figure 19:
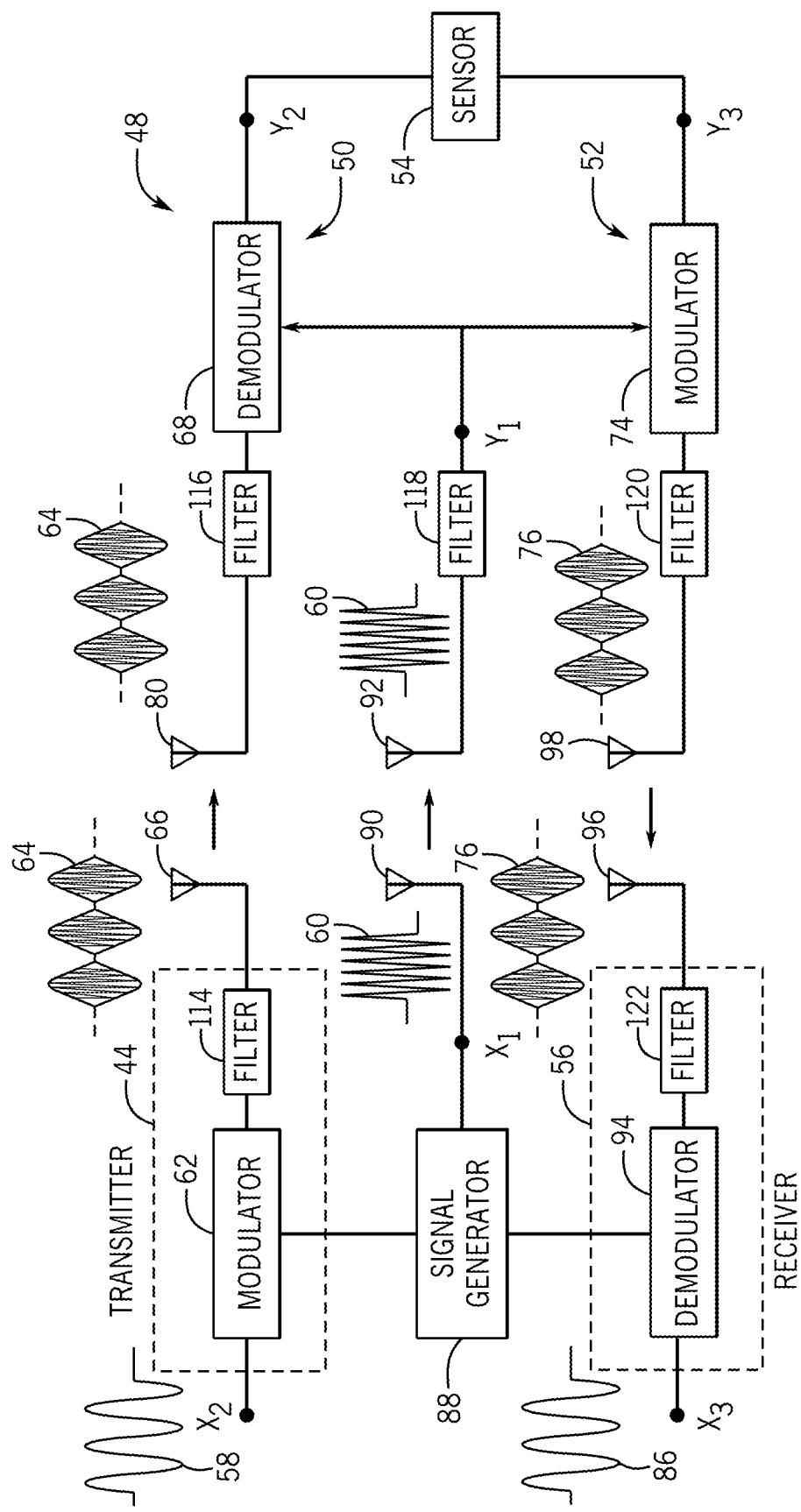
FIG. 19 depicts another exemplary embodiment of a passive wireless sensor system.

The embodiment of the wireless sensor system depicted in FIG. 19 leverages the above identified lower side band 104, upper side band 106 and carrier wave frequency to achieve, with the use of at least one band pass filter to achieve different frequency bands for each of the antenna pairs.

In the embodiment, the transmitter 44 includes a band pass filter 114 between the modulator 62 and the transmitter antenna 66. The filter 114 is exemplarily a band pass filter with a frequency response as represented by 112 in FIG. 18. The frequency response 112 of the filter 114 exemplarily coincides with the frequency spectrum of the upper side band 106. The combined input signal 64 is transmitted between the transmitter antenna 66 and the interrogation antenna 80 in the upper side band frequency. A filter 116 is arranged between the interrogation antenna 80 and the demodulator 68. The filter 116 is also a band pass filter with a frequency response identified at 112 in FIG. 18. Thus, the filter 114 limits the frequency spectrum used between the antenna pair 66, 80 and the filter 116 removes any antenna cross talk outside of the same passband.

As presented above, the carrier wave 60 is transmitted by the signal generator antenna 90 at a carrier wave frequency fc. A filter 118 is connected to the carrier wave input antenna 92. The filter 118 is exemplarily a band pass filter with a frequency response as presented at 110 in FIG. 18. The filter 118 with this frequency response removes any signal cross talk outside of the carrier wave frequency fc.

After the modulator 74 has modulated the output of the sensor 54 with the carrier wave signal, this signal is filtered by a filter 120 between the modulator 74 and the reply antenna 98. The filter 120 is exemplarily a band pass filter with a frequency response as represented at 108 in FIG. 18. The frequency response of the band pass filter 120 exemplarily coincides with the frequency spectrum of the lower side band 104. The combined output signal 76 is transmitted from the reply antenna 98 to the receiver antenna 96 in the frequencies of the lower side band. A filter 122 is positioned between the receiver antenna 96 and the demodulator 94. The filter 122 is exemplarily a band pass filter with a frequency response as depicted at 108 in FIG. 18. Thus, the pass band of the filter 122 corresponds to the frequency spectrum of the lower sideband 104 and therefore the filter 122 removes any cross talk not associated with the transmission of the combined out put signal 76 between the reply antenna 98 and the receiver antenna 96.

Figure 20:
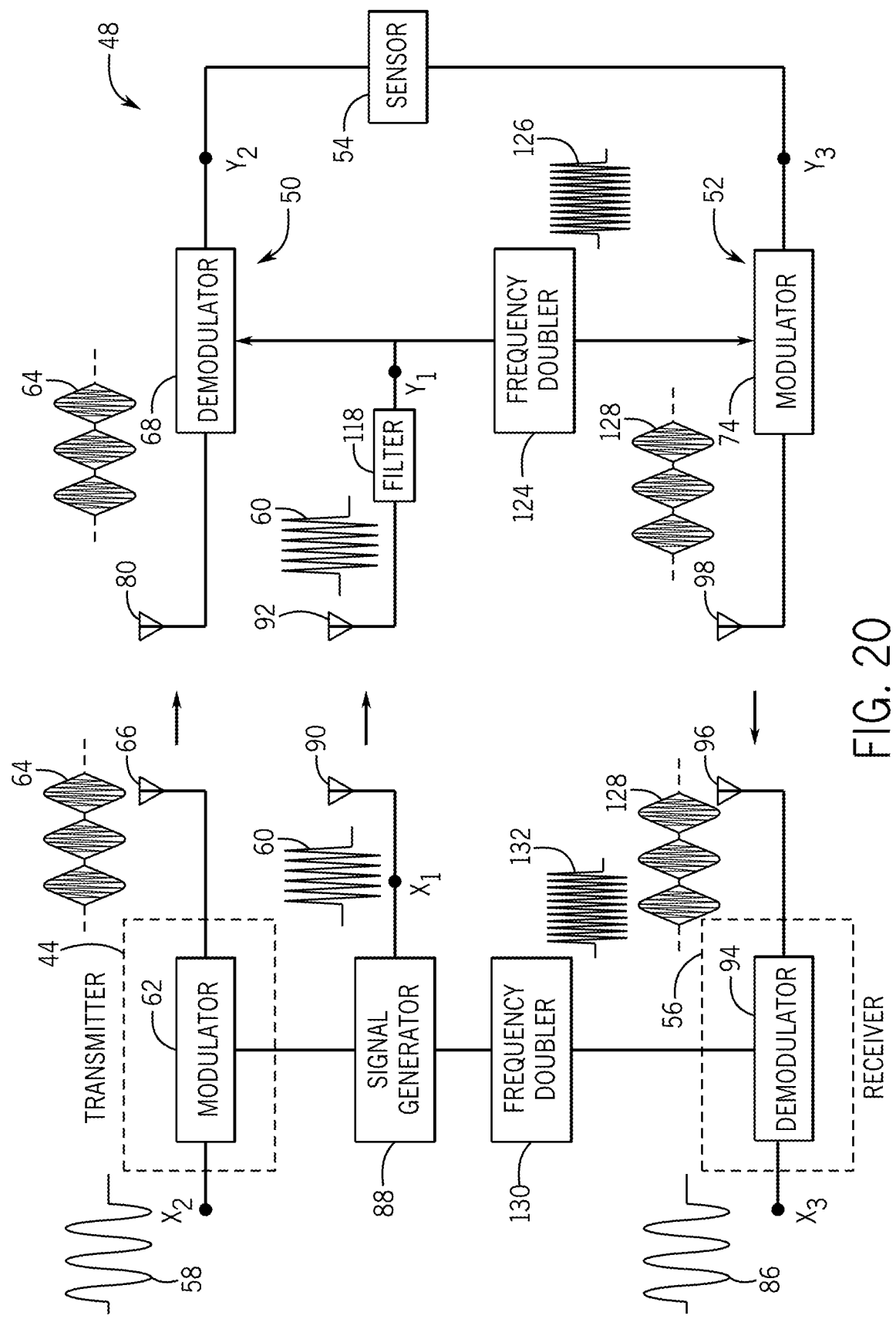
FIG. 20 depicts a further exemplary embodiment of a passive wireless sensor system.

FIG. 20 depicts a further embodiment that uses a circuit element called a frequency multiplier of which one implementation is a frequency doubler. A frequency multiplier is an electronic circuit that generates an output signal with a frequency that is a harmonic or multiple of the frequency of the input signal. The frequency doubler is an embodiment that produces an output signal in which the frequency is twice that of the input signal frequency. While frequency doublers are used in the embodiment described in further detail herein, it will be understood that other frequency multiples may be used in embodiments as well. In the embodiment depicted in FIG. 20, the front end 50 of the wireless sensor 48 is exemplarily the same as the front end 50 as described above with respect to FIG. 17. The filter 118 is connected to the carrier wave input antenna 92 and filters the signal received at the carrier wave input antenna 92 to remove cross talk and other interference to provide the carrier wave 60. The carrier wave 60 is provided to a frequency multiplier, exemplarily a frequency doubler 124 as described above. The frequency doubler 124 provides an output carrier wave 126 with a double frequency from the carrier wave 60. The doubled frequency carrier wave 126 is provided to the modulator 74 and used by the modulator 74 to produce an output carrier wave 128 at the doubled frequency. The doubled frequency output carrier wave 128 is transmitted from the reply antenna 98 to the receiver antenna 96. Thus, communication between the transmitter antenna 66 and the interrogation antenna 80 occur at the frequencies 104, 102, and 106 depicted in FIG. 18. Communications between the signal generator antenna 90 and the carrier wave input antenna 92 are filtered with the filter 118 to remove the lower side band and the upper side band frequency spectrum, as well as any other interference frequencies including, but not limited to that of the output carrier wave 128, to pass the carrier wave 60. Communication between the reply antenna 98 and the receiver antenna 96 occurs at twice the frequency and the associated upper side bands and lower side bands thereof. Thus, communication between each of the three antenna pairs occur in different frequency bands, eliminating cross talk.

The demodulator 94 receives the doubled combined signal 128. The carrier wave 60 produced by the signal generator 88 is further provided to an additional frequency doubler 130 which produces a doubled frequency carrier wave 132 which is also provided to the demodulator 94. The demodulator 94 uses the doubled carrier wave 132 provided by the frequency doubler 130 to demodulate the doubled combined signal 128 to arrive at the low frequency output signal 86 as originally received by the modulator 74 from the sensor 54.

Figure 21:
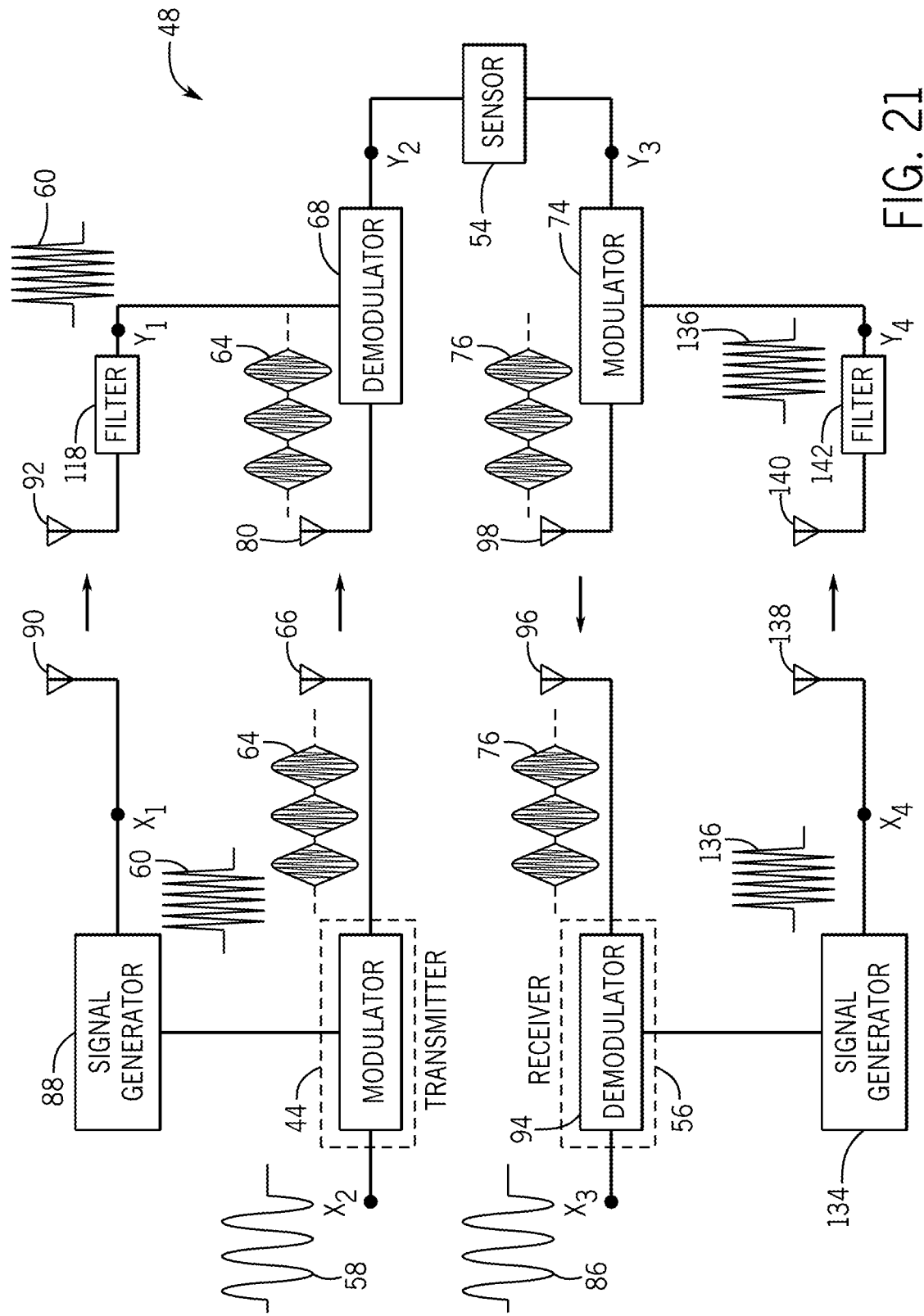
FIG. 21 depicts a still further exemplary embodiment of a passive wireless sensor system.

FIG. 21 depicts a still further exemplary embodiment which uses two different carrier frequencies (fc1 and fc2) respectively for the transmit and receive paths. In order to prevent overlap between the side band of the modulated signals in the transmitted and received paths, the frequency separation (fc2−fc1) should be greater than (2 fm+Δfm). Exemplarily, the signal generator 88 is associated with the transmitter 44 while a second signal generator 134 is associated with the receiver 56. The carrier wave 60 produced by the signal generator 88 has a frequency of fc1 and is transmitted between the signal generator antenna 90 and the carrier wave input antenna 92. The filter 118 is exemplarily a band pass filer with a pass band centered on the frequency of the carrier wave 60, fc1. The filtered carrier wave 60 is provided to the demodulator 68 and used by the demodulator 68 to demodulate the received combined input signal 64. The signal generator 134 is associated with the receiver 56 and operates to produce a second carrier wave 136 with a frequency fc2 which is different from the frequency fc1 by at least 2 fm+Δfm as described above. The second carrier wave 136 is provided from a second signal generator antenna 138 to a second carrier wave input antenna 140. A filter 142 is exemplarily a band pass filter with a pass band centered on the second carrier wave frequency fc2 and removes any of the lower side band and upper side band of the combined output signal 76 transmitted by the reply antenna 98, as well as any other interference received by the second carrier wave input antenna 140. The filter 142 outputs the second carrier wave 136 such that the signals are the same at points X4 and Y4 in FIG. 21. The second carrier wave 136 is provided to the modulator 74 and used to modulate the output single from the sensor 54 to one of the combined output signals 76 with a center frequency of fc2. The combined output signal 76 with the center frequency fc2 is transmitted from the reply antenna 98 to the receiver antenna 96 where the combined output 76 is demodulated by the demodulator 94 using the second carrier wave 136 as provided to the demodulator 94 by the signal generator 134.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A passive wireless sensor, comprising:
an antenna that receives a combined signal that comprises a generally low frequency modulating signal modulated on a generally high frequency carrier wave;
a demodulator that receives the combined signal and extracts the modulating signal;
a sensor that receives the extracted modulating signal and produces an output signal indicative of a property to be sensed; and
a modulator that receives the output signal from the sensor and the generally high frequency carrier wave from the combined signal and modulates the output signal onto the high frequency carrier wave, to create a combined output signal which is broadcast by the antenna.

2. The passive wireless sensor of claim 1, wherein the sensor is an ultrasonic flow sensor.

3. The passive wireless sensor of claim 2, wherein the ultrasonic flow sensor comprises a first transducer and a second transducer, and a transit time of the extracted modulating signal between the first transducer and second transducer is indicative of a flow rate through the ultrasonic flow sensor.

4. The passive wireless sensor of claim 1, further comprising a storage device that receives the generally high frequency carrier wave from the combined signal, stores the generally high frequency carrier wave for a predetermined length of time and provides the generally high frequency carrier wave to the modulator after the predetermined length of time.

5. The passive wireless sensor of claim 4, wherein the storage device is a resonator.

6. The passive wireless sensor of claim 4 wherein the predetermined length of time is a time for the extracted modulating signal to travel through the sensor to the modulator.

7. The passive wireless sensor of claim 1, wherein the antenna comprises a first antenna that receives the combined signal and is connected to the demodulator and a second antenna connected to the modulator, the second antenna broadcasts the combined output signal.

8. The passive wireless sensor of claim 1, wherein the generally low frequency modulating signal is between 0.1 MHz and 40 MHz.

9. The passive wireless sensor of claim 1, wherein the generally high frequency carrier wave frequency is at least 75 MHz.

10. The passive wireless sensor of claim 9 wherein the generally high frequency carrier wave frequency is at least 300 MHz.

11. The passive wireless sensor of claim 1 wherein the sensor is an ultrasonic flow sensor which comprises a first transducer and a second transducer and the output signal comprises a first output signal obtained from at least a portion of the modulating signal passing from the first transducer to the second transducer and a second output obtained from at least a portion of the modulating signal passing from the second transducer to the first transducer;
wherein a difference between a transit time of the first output signal and a transit time of the second output signal is indicative of the property being sensed.

12. The passive wireless sensor of claim 1, further comprising a filter connected to the antenna, wherein the filter receives the combined signal from the antenna, the filter removes the low frequency modulating signal from the combined signal and provides the generally high frequency carrier wave of the carrier wave to the modulator.

13. The passive wireless sensor of claim 12, further comprising a storage device that receives the generally high frequency carrier wave from the filter, stores the generally high frequency carrier wave for a predetermined length of time and provides the generally high frequency carrier wave to the modulator after the predetermined length of time.

14. A passive wireless sensor, comprising:
a first antenna that receives a combined signal that comprises a low frequency modulating signal between 0.1 Mhz and 40 MHz and a high frequency carrier wave;
a demodulator that receives the combined signal and extracts the modulating signal from the combined signal;
an ultrasonic flow sensor receives the extracted modulating signal at a first transducer secured to a conduit and produces an output signal at a second transducer secured to the conduit with a time delay indicative of a flow rate through the conduit;
a modulator that receives the output signal from the second transducer and modulates the output signal onto the high frequency carrier wave from the combined signal, to create a combined output signal; and
a second antenna connected to the modulator, the second antenna broadcasts the combined output signal.

15. The passive wireless sensor of claim 14, wherein the frequency of the high frequency carrier wave is at least 300 MHz.

16. The passive wireless sensor of claim 14, further comprising a filter connected to the first antenna, wherein the filter receives the combined signal from the first antenna, the filter removes the low frequency modulating signal from the combined signal and provides the high frequency carrier wave of the combined signal to the modulator.

17. The passive wireless sensor of claim 16, further comprising a storage device that receives the high frequency carrier wave from the filter, stores the high frequency carrier wave for a predetermined length of time and provides the high frequency carrier wave to the modulator after the predetermined length of time.

18. A wireless sensing system comprising:
a radio frequency (RF) transmitter comprising a modulator which modulates a low frequency modulating signal onto a high frequency carrier wave to create a combined input signal, the RF transmitter comprising a first antenna that transmits the combined input signal;
a passive wireless sensor comprising:
a second antenna that receives the combined input signal;
a demodulator that receives the combined input signal and extracts the low frequency modulating signal;
a sensor that receives the extracted low frequency modulating signal from the demodulator and produces an output signal with a time delay indicative of a property to be sensed;
a modulator that receives the output signal from the sensor and modulates the output signal onto the high frequency carrier wave from the combined input signal to create a combined output signal; and
a third antenna which receives the combined output signal and broadcasts the combined output signal; and
an RF receiver comprising a fourth antenna that receives the combined output signal broadcast by the third antenna, a demodulator of the RF receiver receives the combined output signal and extracts the output signal, a value of the property to be sensed being calculated from the output signal.

19. The wireless sensing system of claim 18, wherein low frequency modulating signal is between 0.1 MHz and 40 MHz and the high frequency carrier wave frequency is at least 75 MHz.

20. The wireless sensing system of claim 18, wherein the passive wireless sensor further comprises a filter connected to the second antenna, wherein the filter receives the combined input signal from the second antenna, the filter removes the low frequency modulating signal from the combined signal and provides the high frequency carrier wave of the combined input signal to the modulator.

* * * * *